Nov. 28, 1967   P. VAN DER LELY   3,354,993
ONE WAY BRAKE FOR A SELF-STARTING SYNCHRONOUS MOTOR
Filed June 8, 1965   2 Sheets-Sheet 1

INVENTOR.
PIET VAN DER LELY

United States Patent Office 3,354,993
Patented Nov. 28, 1967

3,354,993
ONE WAY BRAKE FOR A SELF-STARTING SYNCHRONOUS MOTOR
Piet van der Lely, Emmasingel, Eindhoven, Netherlands, assignor to North American Philips Company, Inc., New York, N.Y., a corporation of Delaware
Filed June 8, 1965, Ser. No. 462,304
Claims priority, application Netherlands, June 9, 1964, 64—6,486; June 16, 1964, 64—6,795
4 Claims. (Cl. 188—82.77)

ABSTRACT OF THE DISCLOSURE

A transmission for a synchronous motor which insures rotation of the motor shaft in a desired direction having a centrifugal force operated detent which blocks rotation of the motor shaft in the undesired direction and a biasing element which provides a reaction force to attempted rotation in the undesired direction which tends to cause rotation in the desired direction.

The invention relates to a transmission between a shaft rotatable in two directions and driven by a small, self-starting synchronous motor and a load to be rotated in one direction only.

To drive apparatus such as tape recorders, dry shaving apparatus, record players, household appliances and the like, it would be desirable to use self-starting synchronous motors on account of their simplicity and compactness, the omission of brushes and hence low heat generation, the omission of electric anti-interference means, little or no maintenance requirements and comparatively low cost. However, their use has been prohibited by the fact that the direction of rotation of these motors is random, i.e., on starting up they may rotate in a clockwise or counter-clockwise direction. Moreover, the starting torque is very small.

The invention has for its object to render the use of such motors practical for applications such as noted above, by providing a transmission mechanism which prohibits rotation of the motor shaft in the undesired direction of rotation, and which includes a coupling element of the friction clutch type which is driven by centrifugal force between the shaft and the load in the desired direction of rotation so that the motor can gain momentum before loading.

Thus, a primary object of the invention is to provide a self-starting synchronous motor in which the shaft can rotate only in the desired direction, and in addition, the adverse effect of the very small starting torque of such motor is overcome by a friction clutch which will slip readily, between the motor shaft and the load, until sufficient rotor speed is attained.

Various embodiments of the invention are possible. In one embodiment described herein, the shaft is provided with a disc having a pin arranged eccentrically on it, around which a spring-loaded body is adapted to turn so as to cooperate, in one direction of rotation of the shaft, with a further, stationary body so that the shaft is held against rotation in this one direction. However, in the desired direction or the opposite direction of rotation said spring loaded body is adapted to cooperate with an output shaft or gear connected to the load, the output shaft being caught by the then rotating motor shaft. In this way a simple construction is obtained, the more so since the coupling between the shaft and the body may also be formed by a friction clutch.

The above and other features, objects and advantages of the present invention will be fully understood from the following description considered in connection with the accompanying illustrative drawings.

A first embodiment of the invention is illustrated schematically in FIGS. 1–3 wherein FIG. 1 is an elevation of a transmission between a self-starting synchronous motor and a load, FIG. 2 is a cross sectional view of the transmission shown in FIG. 1 looking in the direction of the arrow.

A second embodiment of the invention is illustrated schematically in FIGS. 3–6 wherein FIG. 3 is a plan view of a transmission coupling between the shaft of a small electric synchronous motor and an output shaft to be rotated in one direction only.

Figure 1:
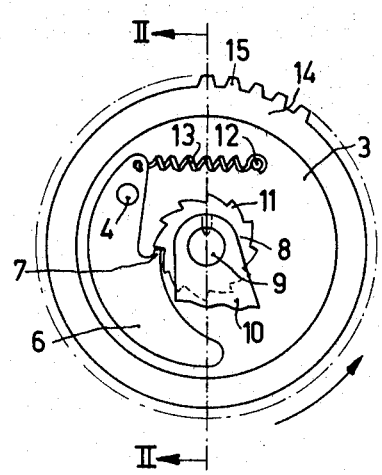
Figure 2:
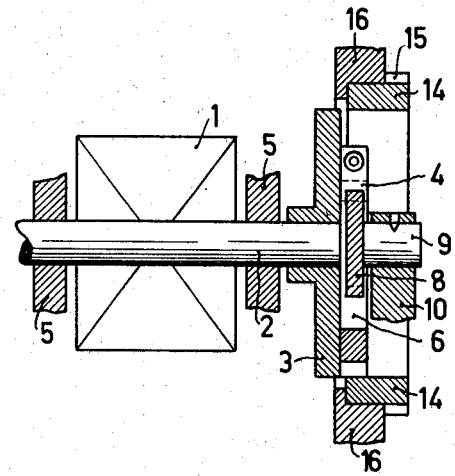
Figure 3:
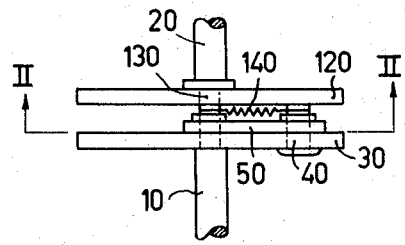
Figure 4:
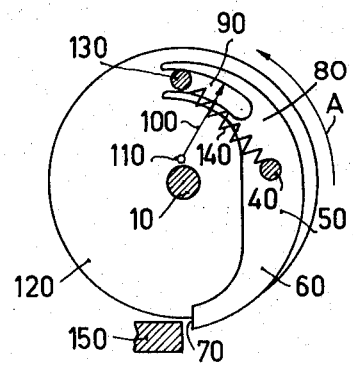
FIG. 4 is a sectional view of the transmission coupling of FIG. 3 taken on the line II—II in the direction of the arrow.

FIGS. 1 and 2 show diagrammatically the rotor 1 of a self-starting synchronous motor, which is secured to a shaft 2. This shaft is connected with a disc 3, rigidly secured thereto. An eccentric pin 4 is connected to disc 3. The shaft 2 is journalled in two bearings 5. A weight 6 is pivotal about the pin 4 and is provided with a pawl 7. A pawl wheel 8 is rigidly secured to a second shaft 9, which is fixed in a stationary support 10. The pawl wheel 8 is provided with teeth 11.

Between the weight 6 and a pin 12 on the disc 3 there is arranged a spring 13, so that the pawl 7 is normally held against one of the teeth 11 of the pawl wheel 8.

An output sleeve or gear ring 14, having gear teeth 15, is mounted for rotation in a stationary bearing 16. The gear ring 14, 15 drives a load (not shown).

When the current circuit of the motor is closed and the rotor 1 of the self-starting synchronous motor starts rotating, it cannot be predicted which sense of rotation the rotor 1 will choose but the direction of rotation of the output gear 14, 15 shown in FIG. 1 is assumed to be counter-clockwise only. When the rotor 1 tends to rotate in the clockwise direction, the pawl 7 abuts against one of the teeth 11 of the pawl wheel 8 so that rotation in a clockwise direction is prohibited. The rotor will then rock or rotate in the other (desired) direction, which is allowed, since the pawl 7 will now slide past the teeth 11. As soon as the speed of the rotor has attained a given value, the weight 6 is pivoted by centrifugal force about the pin 4 and thus comes into contact with the inside surface of the sleeve 14. Initially, the force with which the weight 6 bears on the sleeve 14 is still slight and the sleeve 14 is not driven but at this stage this is desirable since the starting torque of the synchronous motor is small. With the increase in motor speed, the centrifugal force increases and, in addition, the force between weight 6 and sleeve 14 increases to an extent such that the load is set in motion as the sleeve 14 begins to rotate. Thus the same means, i.e., the weight 6, ensures that the motor rotates in the desired sense and is not loaded until its energy supply is sufficiently large.

Referring to FIGS. 3–6, reference numeral 10 designates the shaft of a self-starting synchronous motor. After closure of the current circuit of this motor, the latter can start rotating in either of two directions, but only the direction indicated by the arrow A is the desired one for an output or loaded shaft 20. On the shaft 10 there is rigidly fastened a motor disc 30 which is provided with an eccentric pin 40. A crescent-shaped body 50 is adapted to turn about said pin 40. The body 50 consists of a two-armed lever, one arm 60 of which has a flat side 70, whereas the other arm 80 has a slot 90. The walls of said slot 90 have radii 100 about point 110 which is offset from the center line of the shaft 10.

A disc 120 is rigidly secured to the output shaft 20 which may drive, for example, the turntable of a record player. The output disc 120 is provided with an eccentric pin 130 which fits in the slot 90. A weak spring 140 is arranged between the pins 40 and 130. A stop 150 which may be made adjustable both in a horizontal direction and in a vertical direction is positioned adjacent the discs 30 and 120 for abutment with face 70 of arm 60.

Figure 5:
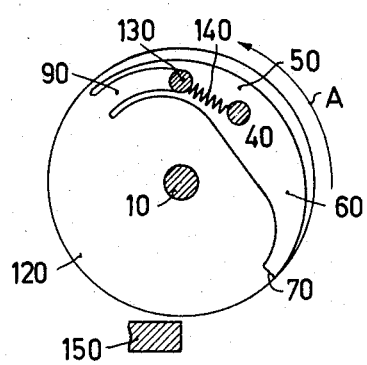
FIG. 5 is a cross sectional view similar to that of FIG. 4, with the parts in a position establishing a direct coupling between the two discs or shafts.

At standstill the rotor of the synchronous motor or the shaft 10 always occupies the same position in which arm 60 is substantially against stop 150. It can be assumed therefore that the body 50 occupies the position shown in FIGS. 3 and 4. When the current circuit of the motor is closed, the motor will start arbitrarily in either of the two directions, clockwise or counterclockwise. If it starts in the direction opposite the desired direction of rotation A, the pin 40 on motor disc 30 will bring the body 50 in this direction (opposite direction A). Then, however, the face 70 abuts against the stop 150 so that the motor disc 30 receives a pulse in the correct direction of rotation. In the first instant of motion the sole resistance to movement in the desired direction is formed by the weak spring 140, which tends to urge the load or output disc 120 in the correct direction. In the meantime, the pin 130 has penetrated more deeply into the slot 90 and thus rotates body 50 about pin 40 by virtue of the coaction between pin 130 and the walls of the slot. When finally the pin 130 engages the bottom of the slot 90, as shown in FIG. 5, the face 70 is completely clear of the stop 150, so that the disc 30 can rotate freely, thereby driving disc 120 via body 50 and the pin 130.

The various dimensions have, of course, to be chosen so that the walls of the slot do not protrude excessively, since they might strike the stop 150.

Figure 6:
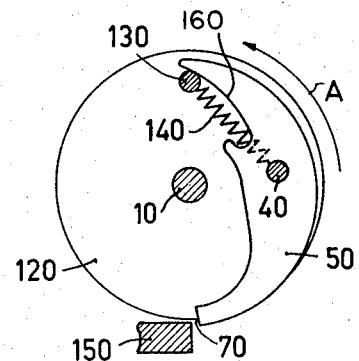
FIG. 6 is a sectional view like FIG. 4, the coupling element being, however, shaped in a little different form.

As is shown in FIG. 6, the body 50 may be provided with a hook 160 which replaces the slot 90. The hook 160 grips around the pin 130. The radius of the portion of the body 50 lying between the pin 130 and the hook 160 must be such that the body 50 turns about the pin 40 when the correct direction of rotation A is obtained.

It will be apparent that the motor can substantially always start under no-load conditions, which is advantageous in view of the small starting torque.

By accurate adjustment of the position of the displaceable stop 150 with respect to the theoretical wavering or rocking position of the rotor, it is even possible to avoid this rocking of the rotor.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. A transmission for providing unidirectional rotation for a synchronous motor comprising: a motor shaft having an end face thereon; an output shaft having an end face thereon; said end faces of said motor shaft and said output shaft being in opposed spaced relation; a body pivotally mounted on said end face of said drive shaft; stop means adjacent said body adapted to engage said body to prevent rotation of said motor shaft in one direction; and a pin mounted on the end face of said output shaft slidably engaging said body, said pin drivably interconnecting said motor shaft and said output shaft during rotation of said motor shaft in the other direction and guiding said body into abutting engagement with said stop means during rotation in said one direction.

2. A transmission for providing unidirectional rotation for a synchronous motor according to claim 1 wherein: a first disc is mounted on said motor shaft and defines said end face thereof; a second disc is mounted on said output shaft and defines said end face thereof; said body includes an arcuate groove and an arm for engaging said stop means, wherein one wall which defines said groove is eccentrically positioned with respect to the axis of said motor shaft; and said pin is mounted on said second disc and has one end slidingly positioned in said arcuate groove for guiding said body wherein said pin slidingly guides said arm of said body into abutting contact with said stop means during rotation of said motor shaft in one direction thereby precluding further rotation and engages one of said groove walls and thereby interconnects said motor shaft and said output shaft during rotation of said motor shaft in said other direction.

3. A transmission for providing unidirectional rotation for a synchronous motor according to claim 1 further comprising a spring interconnecting said pin and said body wherein rotation of said motor shaft in said one direction will tension said spring thereby providing a reaction force resisting said rotation.

4. A transmission for providing unidirectional rotation for a synchronous motor according to claim 2 further comprising a spring interconnecting said pin and said body wherein rotation of said motor shaft in said one direction will tension said spring thereby providing a reaction force resisting said rotation.

References Cited

UNITED STATES PATENTS

| | | | |
|---|---|---|---|
| 1,908,905 | 5/1933 | Landahl | 188—82.77 |
| 2,341,753 | 2/1944 | Zwald | 188—82.77 |
| 2,750,007 | 6/1956 | Turner et al. | 188—82.77 |
| 3,135,137 | 6/1964 | Cunningham | 188—82.77 |
| 3,200,915 | 8/1965 | Lundin | 310—41 |
| 3,231,770 | 1/1966 | Hyde | 310—156 |

FOREIGN PATENTS 1,091,221  10/1960  Germany.

DONLEY J. STOCKING, *Primary Examiner.*

THOMAS C. PERRY, *Examiner.*